Patented Mar. 9, 1948

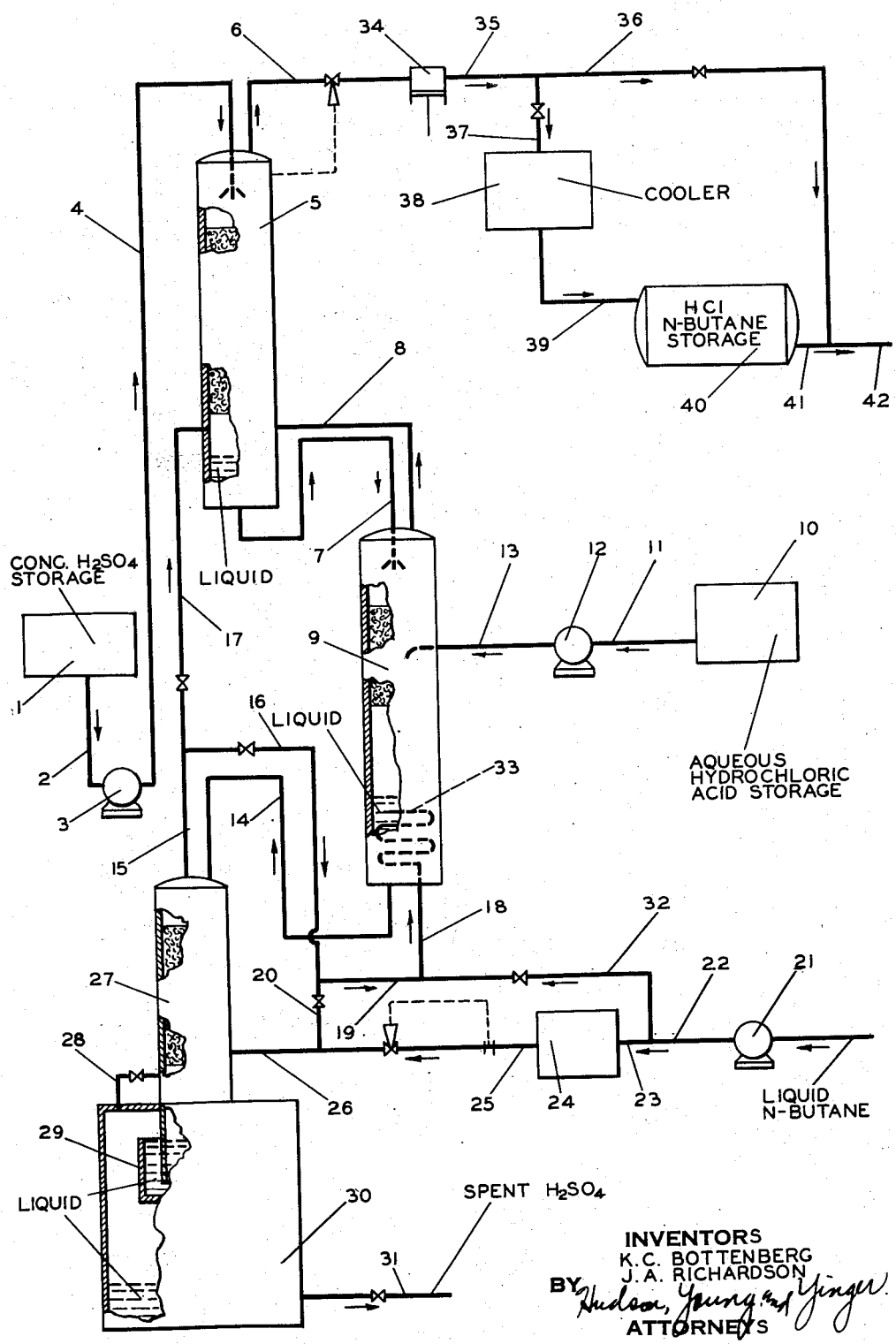

2,437,290

UNITED STATES PATENT OFFICE 2,437,290

METHOD FOR MANUFACTURING ANHYDROUS HCl

Kenneth C. Bottenberg and James A. Richardson, Bartlesville, Okla., assignors to Phillips Petroleum Company, a corporation of Delaware Application August 9, 1943, Serial No. 498,006

14 Claims. (Cl. 23—154)

This invention relates to an improved means for making substantially anhydrous hydrogen chloride by desorption of the same from aqueous solutions with a suitable desorption agent. More particularly this invention relates to the manufacture of anhydrous hydrogen chloride by desorption of hydrogen chloride from aqueous solutions with concentrated sulfuric acid as the desorption agent in the presence of liquid normal butane or vaporized normal butane or both. The liquid normal butane serves as a refrigerant for controlling the reaction temperatures. The resultant butane vapors or the butane vapors introduced as such or both serve as a stripping agent for removing the hydrogen chloride from the sulfuric acid-water mixture resulting from the reaction.

In its broader aspects, the present invention involves a process of recovering anhydrous hydrogen chloride from an aqueous solution thereof by contacting the solution intimately with concentrated sulfuric acid and simultaneously stripping HCl from the sulfuric acid by injecting an inert anhydrous stripping gas into a portion or all of the reaction mixture, for example into the sulfuric acid prior to its removal from the system. The anhydrous mixture of the inert gas and HCl is removed from the system and, with or without separation of the inert gas, is used for the purposes at hand. Suitable measures are preferably taken to effect cooling of the reaction mixture by removing heat of reaction therefrom. In one embodiment the invention embodies the step of injecting a liquid normally gaseous inert material into the reaction zone and thereby simultaneously effecting cooling thereof for temperature maintenance and furnishing the stripping gas or at least a part thereof, a separate stream of the stripping gas being also preferably employed to strip the spent sulfuric acid prior to its removal.

An important object of the present invention is to provide a novel process for the dehydration of hydrogen chloride by means of concentrated sulfuric acid. Another object is to provide such a process which yields an anhydrous mixture of hydrogen chloride and a normally gaseous paraffin, especially propane, normal butane or isobutane, which is adapted to use directly in a hydrocarbon conversion process where anhydrous HCl and the presence of the paraffin are desired. Another object is to provide a novel arrangement of apparatus especially designed for the carrying out of the novel process referred to above. Numerous other objects will hereinafter appear.

Manufacture of anhydrous hydrogen chloride by the desorption or dehydration of hydrochloric acid with sulfuric acid is generally carried out in packed towers. Concentrated sulfuric acid is introduced at the top of the tower and allowed to flow downwardly over the packing. Aqueous hydrochloric acid is introduced at some point between the point of introduction of the sulfuric acid and the bottom of the tower, usually near the middle of the tower. The sulfuric acid dehydrates the hydrochloric acid releasing hydrogen chloride gas. The hydrogen chloride gas passes upwardly through the packed column countercurrent to the flow of the sulfuric acid. In the upper portion of the column the hydrogen chloride gas contacts concentrated sulfuric acid which serves to remove traces of moisture vaporized in the dehydration reaction zone. Consequently, the resultant hydrogen chloride gas which leaves the top of the tower is essentially anhydrous. However, the disadvantages of this method of making anhydrous hydrogen chloride are:

(1) Heat is released in the dehydration zone causing a temperature rise which in turn increases the difficulty of handling the resultant dilute acid mixtures.

(2) Hydrogen chloride is least soluble in sulfuric acid-water mixtures of 85 to 90 per cent $H_2SO_4$; consequently, unless the final $H_2SO_4$-water mixture is in the extremely narrow range of 85 to 90 per cent $H_2SO_4$, which is seldom attained in practice, a considerable amount of hydrogen chloride will be lost in the spent sulfuric acid-water mixture. Also there is a tendency for hydrogen chloride gas to form what apparently is a supersaturated solution with sulfuric acid-water mixtures making the hydrogen chloride losses greater than would be indicated by the normal solubility of hydrogen chloride in $H_2SO_4$-water mixtures.

(3) Because of the solubility of hydrogen chloride in solutions of 85 per cent or less sulfuric acid, the full dehydrating capacity of the sulfuric acid cannot be utilized without considerable hydrogen chloride loss.

Our invention provides a means for overcoming these difficulties through the use of either or both a vaporous or liquefied inert normally gaseous material. When a liquefied normally gaseous material is used it is admitted to the reaction zone and allowed to vaporize, thus supplying refrigeration for removing the heat of hydration of the sulfuric acid resulting from the desorption of hydrogen chloride from hydrochloric acid. Consequently, this provides a means for controlling the temperature in the reaction zone. The vaporized inert gas passes upwardly through the reaction chamber acting as a stripping agent for the removal of hydrogen chloride gas. When a vaporous stream of the inert gas is used either alone or in addition to any resulting from the use of the same material in the liquid form as a refrigerant it is introduced at a low point in the reaction column for effecting or completing the hydrogen chloride stripping operation. Through the use of an inert stripping gas, the sulfuric acid may be spent to lower concentrations than is otherwise possible without an appreciable amount of hydrogen chloride remaining dissolved in the spent acid. Through the use of inert stripping vapors practically no hydrogen chloride is retained in the resultant $H_2SO_4$-water mixtures.

We have found that the above described operation can be carried out for example in a single packed column by introducing concentrated sulfuric acid at the top, muriatic acid near the middle, a liquefied inert normally gaseous material just below the point of introduction of the muriatic acid to act as a refrigerant and to supply stripping vapors, and a vaporous stream of the inert gas near the bottom of the column for effecting or completing the stripping operation. However, we prefer to use three separate packed towers to permit better control over the reaction and to permit the use of materials of construction best suited to what corresponds to the upper, middle, and bottom sections of a single column which will be designated as the drying, reaction, and stripping zones, respectively. In this aspect of our invention the three separate columns are arranged one above another and interconnected in such manner as to permit vapors to flow upwardly from the bottom, to the top column or from the bottom column, through the middle column, to the top column. Connections are also provided to permit the flow of liquid downwardly from the top column into the middle and from the middle column into the bottom column. The liquid lines are provided with suitable overflow traps or seals for maintaining a liquid level in the top and middle columns. The bottom column is also provided with a liquid seal. These seals serve as automatic liquid level controls. This type of liquid level control is particularly advantageous since it is difficult to adapt the conventional type automatic controls for the handling of corrosive acid mixtures such as are introduced and removed in the above described process. The resultant dry hydrogen chloride-inert gas mixture is relatively non-corrosive, consequently conventional type automatic controls may be employed on this stream.

The inert stripping gas preferably is one which is comparatively easily liquefied and readily separable from the hydrogen chloride by distillation to permit the recovery of pure hydrogen chloride if desired. The inert normally gaseous material used as refrigerant and as stripping gas preferably should be essentially anhydrous in order to prevent the additional introduction of water through this medium. We prefer to use various of the light normally gaseous hydrocarbons such as propane, n-butane, isobutane, etc. The $C_3$ and $C_4$ paraffins are especially preferred. These hydrocarbons are normally gaseous but are comparatively easily liquefied. Consequently, they fulfill the requirements previously set forth for the inert refrigerant and stripping agent. Also, anhydrous hydrogen chloride is appreciably soluble in these hydrocarbons when they are in liquefied form. Consequently, if desired, the stripping gas may be liquefied and the hydrogen chloride retained in solution in the hydrocarbon for storage purposes. For example, a liquid butane-HCl mixture can be stored at 200 pounds per square inch pressure at 100° F. To store pure hydrogen chloride as a liquid, a pressure of 950 pounds per square inch at 100° F. is required. This would require expensive high pressure equipment as compared with the lighter equipment required for storage at 200 pounds per square inch pressure. Thus it will be seen that liquefaction of the mixture of the inert stripping gas, especially the $C_3$ and $C_4$ paraffins, and the HCl may be effected at ordinary atmospheric temperature by only moderately elevated pressures, whereby storage and handling in liquid form is facilitated. However, heavier hydrocarbons may also be used and in some instances may be desirable. For example, in the isomerization of normal pentane to isopentane using anhydrous aluminum chloride as the catalyst, it would be desirable to use normal pentane as the stripping gas when using this method for generating the anhydrous hydrogen chloride promoter. Use of a lighter or heavier stripping gas would contaminate the product unless the hydrogen chloride were first fractionated from the stripping gas before introduction into the isomerization zone.

We have found our process particularly advantageous when used in connection with light hydrocarbon conversion processes, requiring the presence of anhydrous hydrogen chloride, such as chlorination, hydrochlorination, alkylation with anhydrous aluminum chloride, isomerization with anhydrous aluminum chloride, etc. For example, we have used our process in connection with a normal butane isomerization process employing anhydrous aluminum chloride as the catalyst and anhydrous hydrogen chloride as a promoter. The hydrogen chloride was manufactured by our process using normal butane as the refrigerant and stripping agent. The resultant mixture of anhydrous hydrogen chloride and normal butane vapors was cooled, compressed and stored as such at about 200 pounds per square inch pressure. The hydrogen chloride content of this mixture was about 10 per cent by weight. This mixture was fed into the isomerization unit along with the feed. The amount introduced with the feed was varied as was necessary for maintaining the hydrogen chloride content of the feed stream at about 4 to 10 mol per cent when including the hydrogen chloride recovered from the effluent isobutane from the unit.

By referring to the drawing, our invention will be more readily understood. The drawing is a schematic diagram, with the towers in section, showing one modification of our invention. Concentrated sulfuric acid is pumped by means of pump 3 from storage tank 1 through lines 2 and 4 into the top of packed tower 5 where it flows downwardly over suitable packing and enters the top of column 9 through line 7 which is so arranged as to form a liquid seal between columns 5 and 9 and maintain a liquid level in column 5. The upper portion of column 9 is packed with suitable packing such as stoneware rings. In the packed portion of this tower the sulfuric acid is contacted with a stream of the water-containing hydrochloric acid, pumped from storage tank 10 by means of pump 12 through lines 11 and 13. The hydrochloric acid is dehydrated by the concentrated sulfuric acid and hydrogen chloride vapors are released to pass upwardly through column 9 into column 5 through vapor line 8 between the top of column 9 and the bottom of column 5. Vapor line 8 enters column 5 above the liquid level maintained therein. The resultant $H_2SO_4$-HCl-water mixture produced in the upper portion of column 9 descends to the unpacked bottom portion and by means of line 14 drains into column 27. Line 14 is so arranged as to form a trap or liquid seal between columns 9 and 27 and maintain a liquid level in column 9. During the formation of the $H_2SO_4$-HCl-water mixture in column 9, an appreciable amount of heat is generated. The heat thus released is dissipated by introducing liquid normal butane from a supply source (not shown) through pump 21, line 22, and branch lines 32 and 18 into the bottom of column 9 below the liquid level maintained therein. The liquid butane is introduced through a perforated coil of tubing 33 immersed in the hot liquid in the bottom of column 9. The liquid butane is vaporized, the latent heat of vaporization being obtained from the hot $H_2SO_4$-HCl-water mixture. The thus cooled liquid passes through line 14 into tower 27. The butane vapors rise upwardly through column 9 to act as a stripping agent in the packed section thus removing considerable hydrogen chloride gas that would otherwise remain dissolved in the $H_2SO_4$-HCl-water mixture. Also, any liquid butane entrained in the butane vapors is vaporized in this section thus supplying some cooling in this area. The butane vapors and hydrogen chloride gas pass upwardly into column 5 by means of line 8.

If desired, the liquid butane may be passed in indirect heat exchange relation through a coil of tubing having no perforation and located in the liquid space in tower 9. Thus, the refrigeration would be essentially indirect. Or, if desired, the liquid butane may be introduced directly into the bottom of the tower 9 as a liquid thereby giving direct refrigeration.

The liquid from the bottom of column 9 enters the top of packed column 27 and flows downwardly over the packing therein. A stream of butane is pumped by means of pump 21 through line 22, branch line 23, vaporizer 24, and lines 25 and 26 into the bottom of tower 27 above the liquid level maintained therein. The vaporized butane passes upwardly through this tower and serves as a stripping agent to remove substantially all of the residual hydrogen chloride dissolved in the $H_2SO_4$-HCl-water mixture from tower 9. The butane and hydrogen chloride vapors (which are almost anhydrous) leave tower 27 by vapor lines 15 and 17 to enter the bottom of column 5 above the liquid level maintained therein. By pass line 16 is provided connecting the overhead vapor line 15 of the bottom column 27 with branched lines 18 and 19 on the bottom of column 9, thus permitting passage of the overhead vapors from column 27 upwardly through column 9, the reaction zone, if so desired. By pass line 20 from line 26 to branch lines 18 and 19 is also provided to permit adding either or both vaporous or liquid butane from an external source (not shown) into the reaction zone. Normally, however, the overhead vapors from column 27 will pass directly to column 5, by-passing column 9. Also, it will usually not be necessary to introduce a vaporous stripping gas stream into the reaction zone.

The liquid from the bottom of tower 27 drains into storage container 30 through liquid seal 29 which serves to maintain a liquid level in tower 27. The pressure between the vapor space in the storage tank 30 and tower 27 is equalized by means of line 28 venting from tank 30 into tower 27 above the liquid level maintained therein. The spent or dilute sulfuric acid is removed from tank 30 through line 31. This acid may be discarded, reconcentrated, used in other processes, etc.

The combined hydrogen chloride and butane vapors from towers 27 and 9, respectively, pass upwardly through tower 5 countercurrently to the flow of the fresh concentrated sulfuric acid being introduced in the top of this tower as previously described. The fresh concentrated sulfuric acid serves to substantially completely remove any water remaining in the hydrogen chloride-butane vapors. The dry hydrogen chloride-butane vapors are removed from the top of column 5 through line 6 to enter compressor 34. The vapors are compressed in compressor 34 and discharged through line 35 into branch line 37 and cooler 38. Sufficient cooling is supplied in 38 to condense the hydrogen chloride-butane vapors. This liquid is conducted by means of line 39 into storage tank 40. Storage tank 40 is provided with line 41 and 42 for removal of product as desired. Branch line 36 by-passing cooler 38 and storage tank 40 is provided for supplying hydrogen chloride-butane vapors, if a vaporous product instead of a liquid is desired.

*Example*

In a process substantially as described above hydrochloric acid and concentrated sulfuric acid at a 90° F. temperature were introduced at the proper points in columns 9 and 5, respectively. Column 5 operated at a top temperature of about 130° F. Column 9 had a maximum temperature of about 140° F. in the top section and about 120° F. in the bottom where refrigeration was applied. Column 9 operated at substantially 120° F. The pressure on the columns was about 35 pounds per square inch gage. Normal butane was used as an inert cooling and stripping agent. The dry hydrogen chloride-butane vapors from the top of column 5 were compressed, condensed, and stored in tank 40 at about 200 pounds pressure (gage) at a temperature of about 100° F. Under these conditions the following stream compositions and material balance was obtained.

| Stream No.[1] | Composition and Material Balance, Pounds per Hour | | | | | | | | |
|---|---|---|---|---|---|---|---|---|---|
| | 4 | 31 | 13 | 8 | 6 | 14 | 18 | 26 | 7 |
| $H_2SO_4$ | 272.5 | 272.5 | | | | 272.5 | | | 272.5 |
| $H_2O$ | 20.5 | 76.5 | | 2 | | 56 | | | 2 |
| HCl | | | 56 | 20 | 21 | 1 | | | |
| N-Butane | | | 21 | 95 | 195 | | 95 | 100 | |
| Total | 293.0 | 349.0 | 77 | 117 | 216 | 329.5 | 95 | 100 | 274.5 |

[1] These numbers refer to streams flowing in lines indicated by the same numbers on the drawing.

A great many advantages of the process and apparatus of the present invention will be apparent to those skilled in the art. Among these are the fact that the invention makes possible the ready and economical production of anhydrous hydrogen chloride. The spent sulfuric acid removed from the system is practically and usually completely free from hydrogen chloride. The temperature in the reaction zone is very easily kept under control by the injection of the liquefied refrigerant and vaporization thereof in direct contact with the contents of the reaction zone and the resulting vapors function to strip hydrogen chloride. There is produced an anhydrous mixture of HCl and the stripping gas which is adapted to use directly as a source of HCl or after separation of the stripping gas in any known or suitable way.

The apparatus described herein presents a number of novel advantageous features. By separating the apparatus into three distinct sections, namely a reaction zone, a drying zone, and a stripping zone, which are susceptible to individual conditions and control, many constructional and operational advantages result. Thus the apparatus forming each of these zones may be individually designed of appropriate size and material. The temperatures maintained in the several zones can be independent of one another by virtue of the design shown. Foaming occurs when concentrated sulfuric acid and muriatic acid are admixed. Separating the reaction zone from the stripping and drying zones and making it sufficiently large allows time for the foam to break down so that the vapors do not entrain it and carry it into the drying zone. Numerous other advantages of the present invention will be evident to workers in the art.

We claim:

1. A process of recovering substantially anhydrous hydrogen chloride from an aqueous solution thereof which comprises intimately contacting said aqueous solution with concentrated sulfuric acid in a contacting zone, injecting directly into the mixture a liquefied stream of a normally gaseous inert material and thereby effecting simultaneous cooling of the mixture and liberation of a stripping gas, passing said liberated gas through said mixture in said contacting zone to effect stripping thereof, removing the resulting almost anhydrous gaseous mixture of the stripping gas and hydrogen chloride from the contacting zone, and removing the spent sulfuric acid from the contacting zone.

2. The process of claim 1 including the further step of passing a separate stream of said inert material in gaseous form through said spent sulfuric acid in a stripping zone separate from said contacting zone to strip essentially all of the hydrogen chloride contained in said spent sulfuric acid.

3. The process of claim 1 including the further step of intimately contacting said almost anhydrous mixture of stripping gas and hydrogen chloride in a drying zone separate from said contacting zone with fresh concentrated sulfuric acid to remove final traces of water therefrom, and passing the resulting concentrated sulfuric acid to said contacting zone and using it therein as the concentrated sulfuric acid.

4. The process of claim 1 wherein said normally gaseous material is a $C_3$ to $C_4$ paraffin.

5. The process of claim 1 wherein said normally gaseous material is normal butane.

6. A process of recovering anhydrous hydrogen chloride from an aqueous solution thereof which comprises feeding a stream of concentrated sulfuric acid from a preceding drying zone into a first stripping zone, feeding a stream of aqueous hydrochloric acid into said stripping zone and intimately contacting it therein with said sulfuric acid, simultaneously injecting a stream of liquefied normally gaseous inert material into said stripping zone and allowing vaporization thereof thereby effecting simultaneous cooling of the stripping zone and liberation of a stripping gas therein, passing the resulting gas through the mixture to effect stripping thereof, removing from the stripping zone the resulting almost anhydrous mixture of said stripping gas and said hydrogen chloride and passing same into said drying zone separate from said stripping zone, intimately contacting said mixture with fresh concentrated sulfuric acid in said drying zone, removing from said drying zone a substantially anhydrous mixture of said stripping gas and hydrogen chloride, removing the resulting concentrated sulfuric acid from said drying zone and using it as the feed to said stripping zone, removing the spent sulfuric acid from said stripping zone and feeding it into a second stripping zone separate from said first stripping zone, stripping said spent acid in said second stripping zone by injecting thereinto a stream of said stripping material in gaseous form and intimately contacting it therewith, removing stripped spent acid essentially free from hydrogen chloride from said second stripping zone, removing from said second stripping zone a nearly anhydrous mixture of said stripping gas and hydrogen chloride, and passing said last-named mixture directly into said drying zone and therein treating it in conjunction with said mixture derived from said first stripping zone.

7. The process of claim 6 wherein said normally gaseous material is a $C_3$ to $C_4$ paraffin.

8. The process of claim 6 wherein said normally gaseous material is normal butane.

9. A process of recovering anhydrous hydrogen chloride from an aqueous solution thereof which comprises intimately contacting said solution with concentrated sulfuric acid derived from the drying zone hereinafter mentioned in a dehydrating zone and thereby generating nearly anhydrous hydrogen chloride gas, passing said nearly anhydrous hydrogen chloride gas to a drying zone and there intimately contacting same with fresh concentrated sulfuric acid and thereby removing substantially all the last traces of moisture therefrom, passing the sulfuric acid from said drying zone into said dehydrating zone, passing the spent sulfuric acid from said dehydrating zone into a stripping zone and there intimately contacting same with a gaseous stream of an inert normally gaseous stripping agent and thereby freeing said spent sulfuric acid from hydrogen chloride, withdrawing the stripped spent sulfuric acid from the system, removing from the stripping zone the nearly anhydrous gaseous mixture of said stripping agent and hydrogen chloride formed therein, passing said nearly anhydrous gaseous mixture of said stripping agent and hydrogen chloride into said drying zone and there intimately contacting same with said fresh concentrated sulfuric acid in admixture with said nearly anhydrous hydrogen chloride gas, and withdrawing from said drying zone a substantially anhydrous gaseous mixture of said stripping agent and hydrogen chloride.

10. The process of claim 9 wherein said stripping agent is a $C_3$ to $C_4$ paraffin.

11. The process of claim 9 wherein said stripping agent is normal butane.

12. The process of claim 9 wherein said stripping agent is vaporized normal butane and wherein liquid normal butane is injected directly into said dehydrating zone and allowed to vaporize therein to effect removal of heat therefrom, the resulting vaporized normal butane also serving as a stripping agent for the removal of hydrogen chloride gas in said dehydrating zone.

13. The process of claim 9 wherein said stripping agent is vaporized normal butane and wherein liquid normal butane is injected directly into said dehydrating zone and allowed to vaporize therein to effect removal of heat therefrom, the resulting vaporized normal butane also serving to strip hydrogen chloride gas from said dehydrating zone, the nearly anhydrous gaseous mixture of normal butane and hydrogen chloride withdrawn from said stripping zone being passed directly into said drying zone and dried therein in admixture with the nearly anhydrous gaseous mixture of normal butane and hydrogen chloride withdrawn from said dehydrating zone.

14. A process of recovering substantially anhydrous hydrogen chloride from an aqueous solution thereof which comprises intimately contacting said aqueous solution with concentrated sulphuric acid, simultaneously passing an inert easily liquefiable hydrocarbon stripping agent into the mixture, removing a substantially anhydrous gaseous mixture of the stripping agent and hydrogen chloride, and liquefying said gaseous mixture.

KENNETH C. BOTTENBERG.
JAMES A. RICHARDSON.

REFERENCES CITED

The following references are of record in the file of this patent:

UNITED STATES PATENTS

| Number | Name | Date |
|---|---|---|
| 961,530 | Quayle | June 14, 1910 |
| 1,458,309 | Richter | June 12, 1923 |
| 1,930,592 | Harnsberger | Oct. 17, 1933 |
| 2,227,953 | Baehr et al. | Jan. 7, 1941 |
| 2,254,788 | Ballard | Sept. 2, 1941 |
| 2,257,533 | Reich | Sept. 30, 1941 |
| 2,332,493 | Petry et al. | Oct. 19, 1943 |
| 2,351,461 | Smith et al. | June 13, 1944 |
| 2,355,857 | Hachmuth | Aug. 15, 1944 |